(12) United States Patent
Ninomiya et al.

(10) Patent No.: US 8,294,863 B2
(45) Date of Patent: Oct. 23, 2012

(54) LIQUID CRYSTAL DISPLAY DEVICE AND METHOD OF PRODUCING THE SAME

(75) Inventors: Toshihiro Ninomiya, Saitama-ken (JP); Norihisa Kakinuma, Saitama-ken (JP); Junsei Tsutsumi, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 544 days.

(21) Appl. No.: 12/494,527

(22) Filed: Jun. 30, 2009

(65) Prior Publication Data

US 2010/0002178 A1 Jan. 7, 2010

(30) Foreign Application Priority Data

Jul. 3, 2008 (JP) ................................ P2008-174895

(51) Int. Cl.
*G02F 1/1343* (2006.01)
(52) U.S. Cl. ........................................ 349/141; 349/138
(58) Field of Classification Search .................... None
See application file for complete search history.

(56) References Cited

U.S. PATENT DOCUMENTS

| 5,646,705 A | * | 7/1997 | Higuchi et al. | 349/143 |
| 6,717,632 B2 | * | 4/2004 | Ha et al. | 349/43 |
| 7,012,657 B2 | | 3/2006 | Hayase et al. | |
| 2002/0109811 A1 | * | 8/2002 | Park et al. | 349/113 |

FOREIGN PATENT DOCUMENTS

JP 2006-317962 11/2006

* cited by examiner

*Primary Examiner* — Lucy Chien
(74) *Attorney, Agent, or Firm* — Oblon, Spivak, McClelland, Maier & Neustadt, L.L.P.

(57) ABSTRACT

A liquid crystal display device having a plurality of pixels arranged in a matrix includes first and second substrates and a liquid crystal layer held therebetween. Switching elements are arranged in each of the pixels on the first substrate. A first organic insulating film covers signal lines, scan lines and switching elements. Common electrodes are formed in the first organic insulating film on the first substrate. Connection elements are electrically connected to the switching elements through first contact holes formed in the first organic insulating film. A second organic insulating film covers the first organic insulating film and the connection elements. Pixel electrodes having slits are formed on the second organic insulating film electrically connected to the respective connection elements through second contact holes formed in the second organic insulating film. The liquid crystal layer is switched by using a lateral electric field between the common and pixel electrodes formed on the first substrate.

7 Claims, 6 Drawing Sheets

LIQUID CRYSTAL DISPLAY DEVICE AND METHOD OF PRODUCING THE SAME

CROSS-REFERENCE TO RELATED APPLICATIONS

This application is based upon and claims the benefit of priority from prior Japanese Patent Application No. 2008-174895 filed Jul. 3, 2008, the entire contents of which are incorporated herein by reference.

TECHNICAL FIELD

The present invention relates to a method of producing a liquid crystal display device, and more particularly to a liquid crystal display device using lateral electric field.

BACKGROUND OF THE INVENTION

In recent years, a flat display panel has been developed replace the CRT display. Particularly, a liquid crystal display has received a great deal of attention due to its lightweight, low profile compactness and low power consumption. More particularly, in an active matrix liquid crystal display device, the FFS (fringe field switching) mode liquid crystal display has attracted attention. A conventional construction of this type is disclosed in Japanese laid-open patent application No. P2006-317962.

On the other hand, silicon (e.g. amorphous silicon and poly-silicon) technology has been applied to a liquid crystal display panel as switching elements in pixels or driving circuits, in order to enable fabrication on a transparent substrate by CVD (chemical vapor deposition).

A conventional method of producing an array substrate using poly-silicon as switching elements will be described.

First, a semiconductor film made of amorphous silicon is disposed on an insulating substrate by CVD. Next, the semiconductor film is instantaneously heated by excimer laser annealing (ELA) so as to be converted into a polycrystalline silicon and is patterned by CDE (Chemical Dry Etching). Then, a gate insulating film and a metal film are disposed on the insulating substrate by sputtering so as to cover the semiconductor film. Next, gate electrodes are formed by RIE (Reactive Ion Etching). Then, source regions and drain regions are formed in the semiconductor film by ion implantation doping using the gate electrodes or a resin as a photo mask.

Next, an interlayer insulating film is disposed on the insulating substrate so as to cover the gate electrodes and the gate insulating film. Moreover, source electrodes and drain electrodes electrically connected to the source and drain regions of the semiconductor film are formed on the interlayer insulating film.

After that, a first organic insulating film having a first contact hole, which is located on the drain electrode, is formed by patterning a photoresist layer on the insulating substrate. Next, a common electrode is formed on the first organic insulating film, and a second organic insulating film having a second contact hole is formed by patterning a photoresist layer on the first organic insulating film and the common electrode. Then, a pixel electrode which is electrically connected to the drain electrode via the first and second contact holes is formed on the second organic insulating film.

Thus, the second contact hole overlies the first contact hole on the drain electrode. Therefore, the total depth of the contact hole to connect the drain electrode to the pixel electrode is the thickness of the first and second organic insulating films. Hence, the depth of the contact hole increases.

Accordingly, some portions of photoresist film of the second organic insulating film are not dissolved in a developer and may remain in the contact hole. The remaining photoresist increases electric resistance between the drain electrode and the pixel electrode and causes a bad connection therebetween.

BRIEF SUMMARY OF THE INVENTION

According to embodiments of the present invention, the present invention has been made to address the above mentioned problems. Thus, there is provided a method of producing a liquid crystal display device including the steps of forming a plurality of signal lines, scan lines and switching elements on an array substrate; forming a first organic insulating film covering the signal lines, the scan lines and the switching elements; forming common electrodes on the first organic insulating film; forming first contact holes in the first organic insulating film corresponding to the switching elements; forming connection elements electrically connected to respective of the switching elements through the first contact holes; forming a second organic insulating film covering the first organic insulating film and the connection elements; forming second contact holes in the second organic insulating film in correspondence with the connection elements; and forming pixel electrodes electrically connected to respective connection elements through the second contact holes.

According to a second aspect of the present invention, there is provided a liquid crystal display device including: a first substrate including a plurality of pixels arranged in a matrix; a second substrate arranged opposite to the first substrate; a liquid crystal layer having liquid crystal molecules held between the first and second substrates; scan lines extending in a row direction of the pixels on the first substrate; signal lines extending in a column direction of the pixels on the first substrate; switching elements arranged in each of the pixels on the first substrate; a first organic insulating film covering the signal lines, the scan lines and the switching elements; a first electrodes formed on the first organic insulating film; connection elements electrically connected to respective switching elements through first contact holes formed in the first organic insulating film; a second organic insulating film covering the first organic insulating film and the connection elements; and second electrodes electrically connected to respective connection elements through second contact holes formed in the second organic insulating film, and wherein the liquid crystal layer is switched by using a lateral electric field between the first and second electrodes formed on the first substrate.

According to a third aspect of the present invention, there is provided an array substrate including: an insulating substrate; scan lines extending in a row direction of pixels on the insulating substrate; signal lines extending in a column direction of the pixels on the insulating substrate; switching elements arranged at each of the pixels on the insulating substrate; a first organic insulating film covering the signal line, the scan lines and the switching elements; common electrodes formed on the first organic insulating film; connection elements electrically connected to respective of the switching elements through first contact holes formed in the first organic insulating film; a second organic insulating film covering the first organic insulating film and the connection elements; and pixel electrodes electrically connected to respective connection elements through second contact holes formed in the second organic insulating film.

BRIEF DESCRIPTION OF THE DRAWINGS

The accompanying drawings, which are incorporated in and constitute a part of the specification, illustrate embodiments of the invention and together with the general description given above and the detailed description of the embodiments given below, serve to explain the principles of the invention.

DETAILED DESCRIPTION OF THE INVENTION

Figure 1:
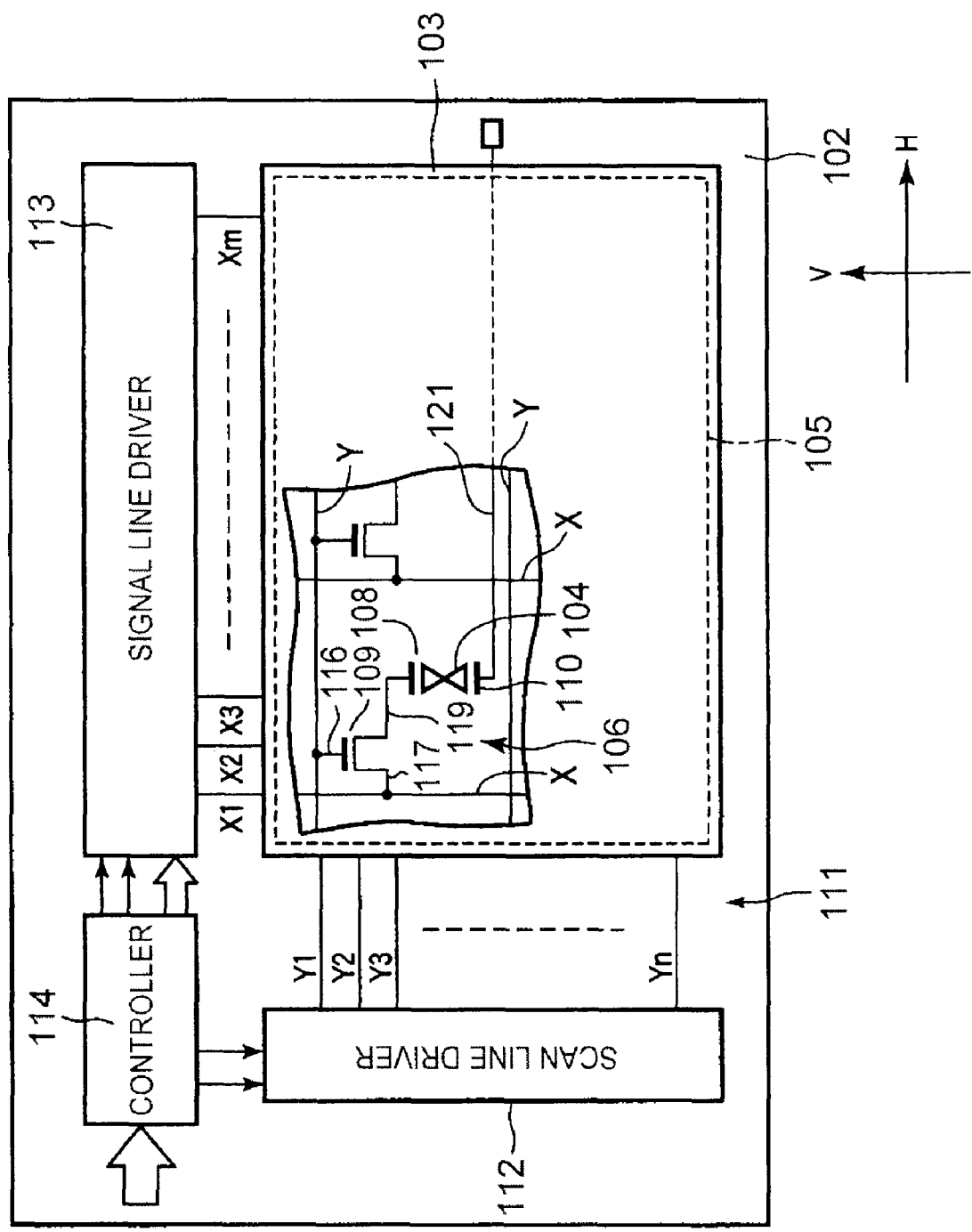
FIG. 1 is a schematic illustration of a liquid crystal display device in accordance with a first embodiment of the present invention.

A liquid crystal display device according to an exemplary embodiment of the present invention will now be described with reference to the accompanying drawings wherein the same or like reference numerals designate the same or corresponding parts throughout the several views.

FIG. 1 to FIG. 4 show a first embodiment applied to a FFS mode liquid crystal display device using a lateral electric field mode, in which pixel and common electrodes are arranged on an array substrate and liquid crystal molecules are switched by using lateral electric field (e.g., the electric field is substantially parallel with main surfaces of substrates).

The liquid crystal display device includes a liquid crystal display panel 100 which has an array substrate 102 (e.g. first substrate), a counter substrate 103 (e.g. second substrate) and liquid crystal layer 104. The counter substrate 103 is arranged opposite to the array substrate 102 with a predetermined gap. The liquid crystal layer 104 is held between the array substrate 102 and the counter substrate 103.

The liquid crystal display device has a display area 105 formed of a plurality of pixels 106 arranged in a matrix for displaying images. The array substrate 102 is made of a light-transmissive insulating substrate 107, for example, a glass substrate or a silica substrate.

That is, the array substrate 102 includes a plurality of pixel electrodes 108 which are located in each pixel, scan lines Y extending in a row direction H of the pixels 106 arranged in a matrix, signal lines X extending in a column direction V of the pixels 106 arranged in a matrix, a plurality of switching elements 109 located at intersections between the scan lines Y and the signal lines X, and common electrodes 110 arranged opposite to the pixel electrodes 108 via a second organic insulating film 122 on the display area 105. The second organic insulating film 122 is made of photoresist. Additionally, the array substrate 102 has a scan line driver 112 connected to a plurality of scan lines Y, and a signal line driver 113 connected to a plurality of signal lines X at the driving circuit area 111, i.e. the periphery of the display area 105, respectively.

Sequential scan signals (drive signals) are supplied from the scan line driver 112 to the plurality of scan lines Y, controlled by a controller 114. Furthermore, picture signals (drive signals) are supplied from the signal line driver 113 to the signal lines X, controlled by the controller 114 while switching on each row of switching elements 109 by the scan signals.

In this way, the pixel electrodes 108 of pixels arranged in a selected row are set at a predetermined electric potential corresponding to the picture signals via the switching elements 109.

Each switching element 109 is made of TFT (thin film transistor). A semiconductor film 115 is made of poly-silicon or amorphous silicon. Gate electrodes 116 of the switching elements 109 are integrally formed with the scan lines Y Source electrodes 117 of the switching elements 109 connected to source regions 118 of the semiconductor films 115 may be integrally formed with the signal lines X. Drain electrodes 119 of the switching elements 109 are connected to drain regions 120 of the semiconductor films 115.

Figure 3:
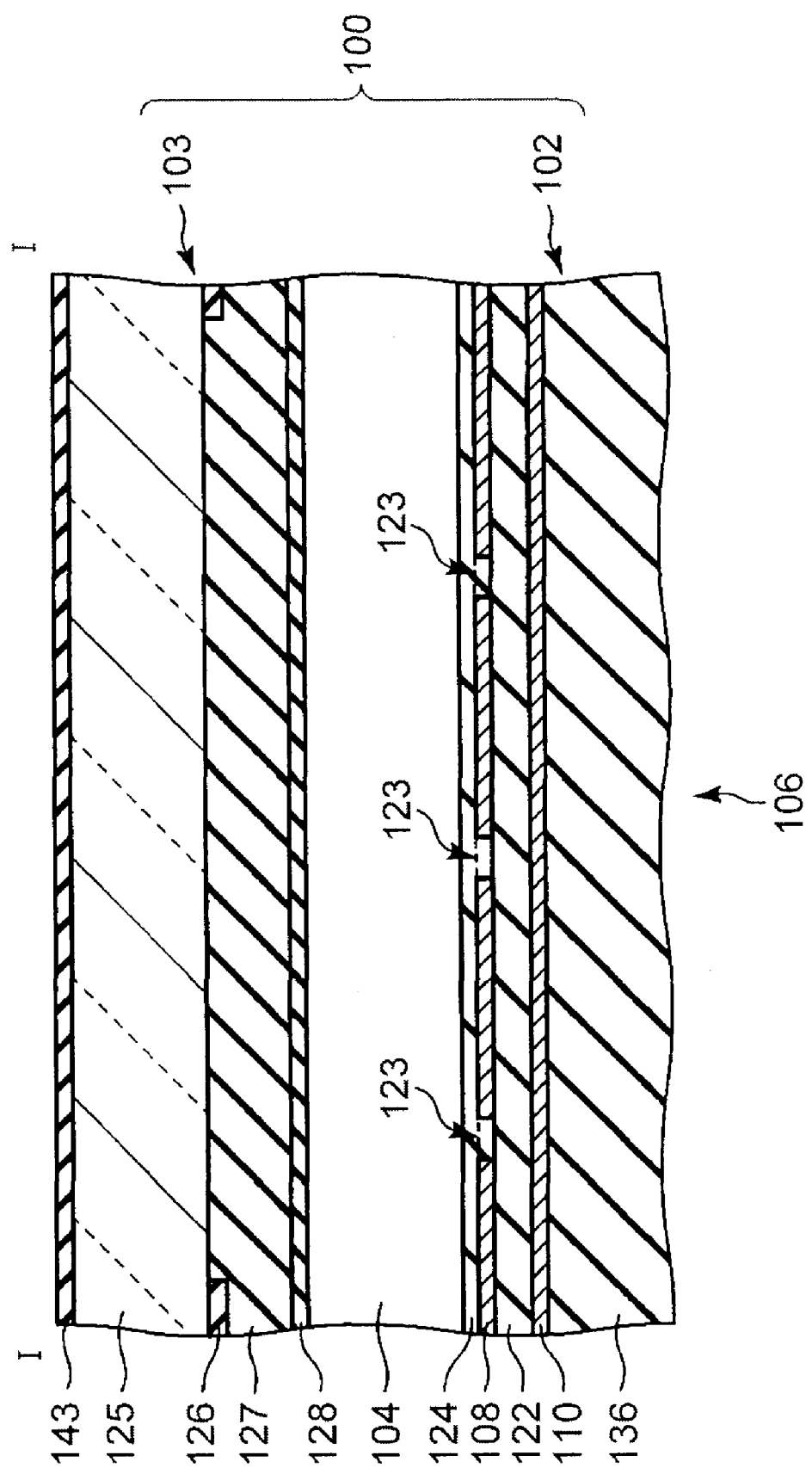
FIG. 3 is a schematic cross sectional view taken on section line □-□ of FIG. 2 of the liquid crystal display device in accordance with the first embodiment of the present invention.

As shown in FIG. 3, the common electrode 110 is formed on each of the pixels 106 and electrically connected to common wirings 121 so as to apply common electric potential. The common electrode 110 is covered with the second organic insulating film 122. The pixel electrodes 108, which are provided with a plurality of slits 123, are arranged opposite to the common electrode 110 on the second organic insulating film 122. The pixel electrodes 108 and the common electrode 110 are made of a light transmissive conductive material, for example, ITO (indium tin oxide) or IZO (indium zinc oxide). An alignment film 124 is disposed on an area of contact between the array substrate 102 and the liquid crystal layer 104 of the array substrate 102.

The counter substrate 103 is made of a light-transmissive insulating substrate 125, for example, a glass substrate or a silica substrate. For use in a color display, the counter substrate 103 includes a black matrix 126 for separating each pixel, and color filter layers 127 which are located on each of the pixels enclosed by the black matrix 126 on the insulating substrate 125. Furthermore, the counter substrate 103 may include a shield electrode which alleviates the electric field from outside or a relatively thick overcoat layer so as to planarize the surfaces of the color filter layers.

The black matrix 126 is disposed opposite to wiring parts, for example, the scan lines Y, the signal lines X and switching elements 109 on the insulating substrate 125. The color filter layers 127 are made of colored resins which are colored in different colors, for example, three primary colors (red, blue and green).

Each of the red colored resins, the blue colored resins and the green colored resin is disposed corresponding to each of respective red color pixels, blue color pixels and green color pixels. An alignment film 128 is disposed on a surface which contacts to the liquid crystal layer 104 of the counter substrate 103.

The above counter substrate 103 and the array substrate 102 are arranged so that the alignment film 124 faces the alignment film 128. Spacers (not shown) are interposed therebetween. Accordingly, a predetermined gap is formed.

The liquid crystal display device includes optical devices 142 and 143 provided to outer surfaces of the liquid crystal display panel 100. The optical devices 142 and 143 include respective polarizers, and a normally black mode display is implemented. The transmissive liquid crystal display panel 100 displays images by transmitting light from a backlight unit which is placed on the side of the array substrate 102 side.

Figure 2:
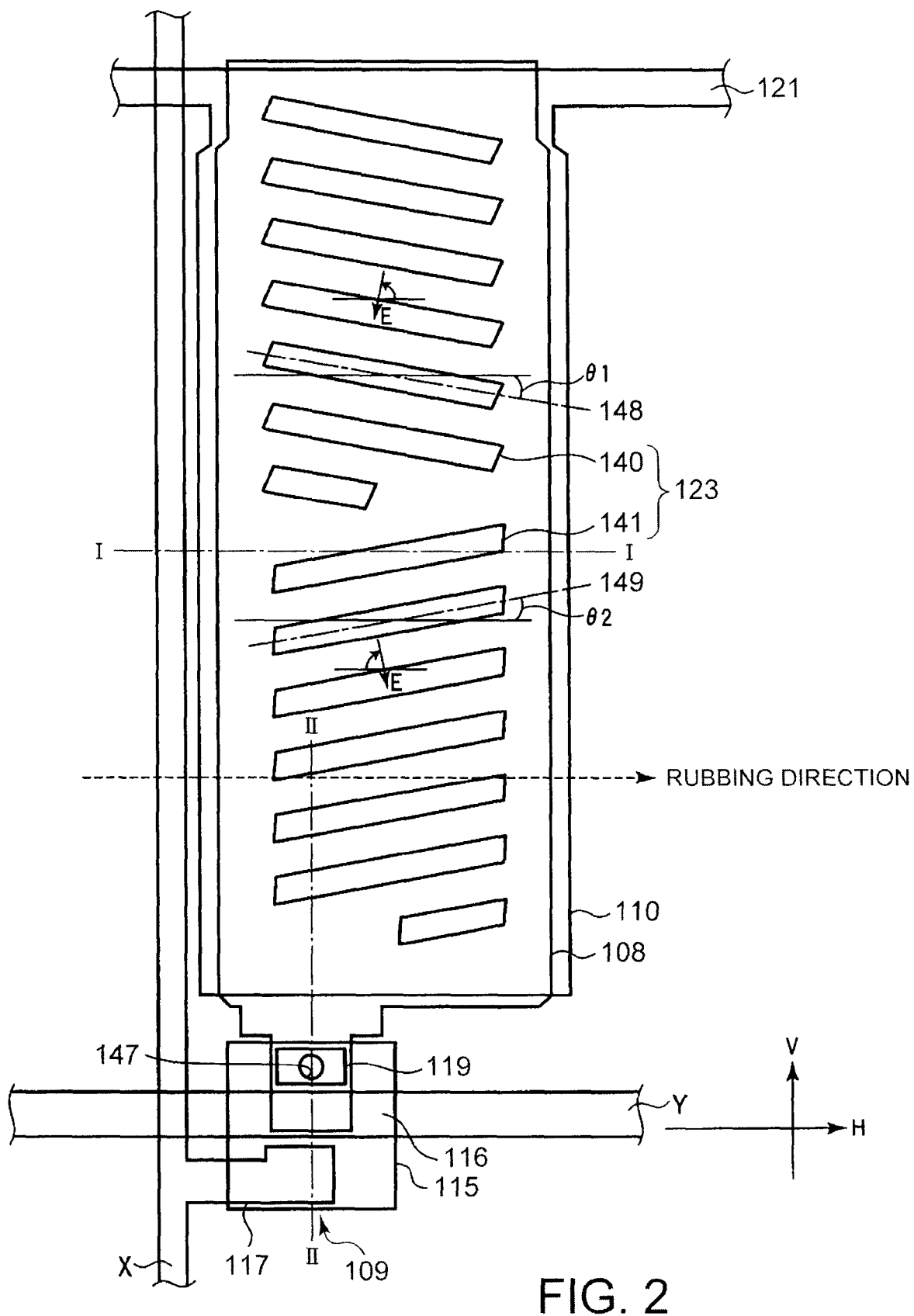
FIG. 2 is a schematic plan view of a pixel of the liquid crystal display device in accordance with the first embodiment of the present invention, including a construction of pixel and common electrodes.

As shown in FIG. 2, the slits 123, which are formed in the pixel electrodes 108 extending along a direction H, are configured to deviate from a direction H at an acute angle. The plurality of slits 123 are spaced apart from each other in a direction H. Specifically, the pixel electrode 108 has the slits 123 extending in at least two directions. For instance, a plurality of slits 140 have a major axis 148 in a first direction, and a plurality of slits 141 have a major axis 149 in a second direction in a pixel. The major axis 148 makes an angle of approximately θ1 (7 degrees) with the row direction H, and the major axis 149 makes an angle of approximately θ2 (7 degrees) with the row direction H in an opposite direction to the major axes 148 and 149 each other.

Accordingly, the major axes 148 and 149 are arranged in symmetry with the direction H. The plurality of slits 140 and 141 are parallel to each other in a pixel. The rubbing direction of the alignment films 124 and 128 is parallel to the direction H.

The liquid crystal molecules in the liquid crystal layer 104 are oriented parallel to the rubbing direction by a restraining force of the alignment films 124 and 128, where there is no electric field between the pixel electrode 108 and the common electrode 110. Then, the light from the backlight unit is absorbed by the polarizers of the optical device 143 in the above construction. In this way, a normally black mode display is achieved.

On the other hand, the lateral electric field is formed along a direction orthogonal to a longitudinal direction of the slits 123, when electric potential difference between the pixel electrodes 108 and the common electrode 110 is established. The liquid crystal molecules are switched due to the electric field E (i.e. the liquid crystal molecules are aligned so that the direction of rotation is oriented in a parallel direction to the electric field E). Then, the liquid crystal molecules rotate in a counterclockwise direction near the slit 140. To the contrary, the liquid crystal molecules rotate in a clockwise direction near the slit 141.

The light from the backlight unit is modulated by optical birefringence of the liquid crystal molecules when being transmitted in the liquid crystal layer 104. Finally, some of the light from the back light unit passes through the polarizer of the optical device 143.

The pixel electrode 108 includes the slits 140 and 141, extending in at least two different directions. Consequently, the liquid crystal molecules corresponding to the slit 140 are rotated in a counterclockwise direction and the liquid crystal molecules corresponding to the slit 141 are rotated in a clockwise direction. This arrangement not only achieves a wide viewing angle but compensates unfavorably colored pictures depending on a direction of viewers.

Next, a construction of the above pixels 106 formed on the array substrate 102 according to a first embodiment of this invention will be described in relation to a production method.

Figure 4:
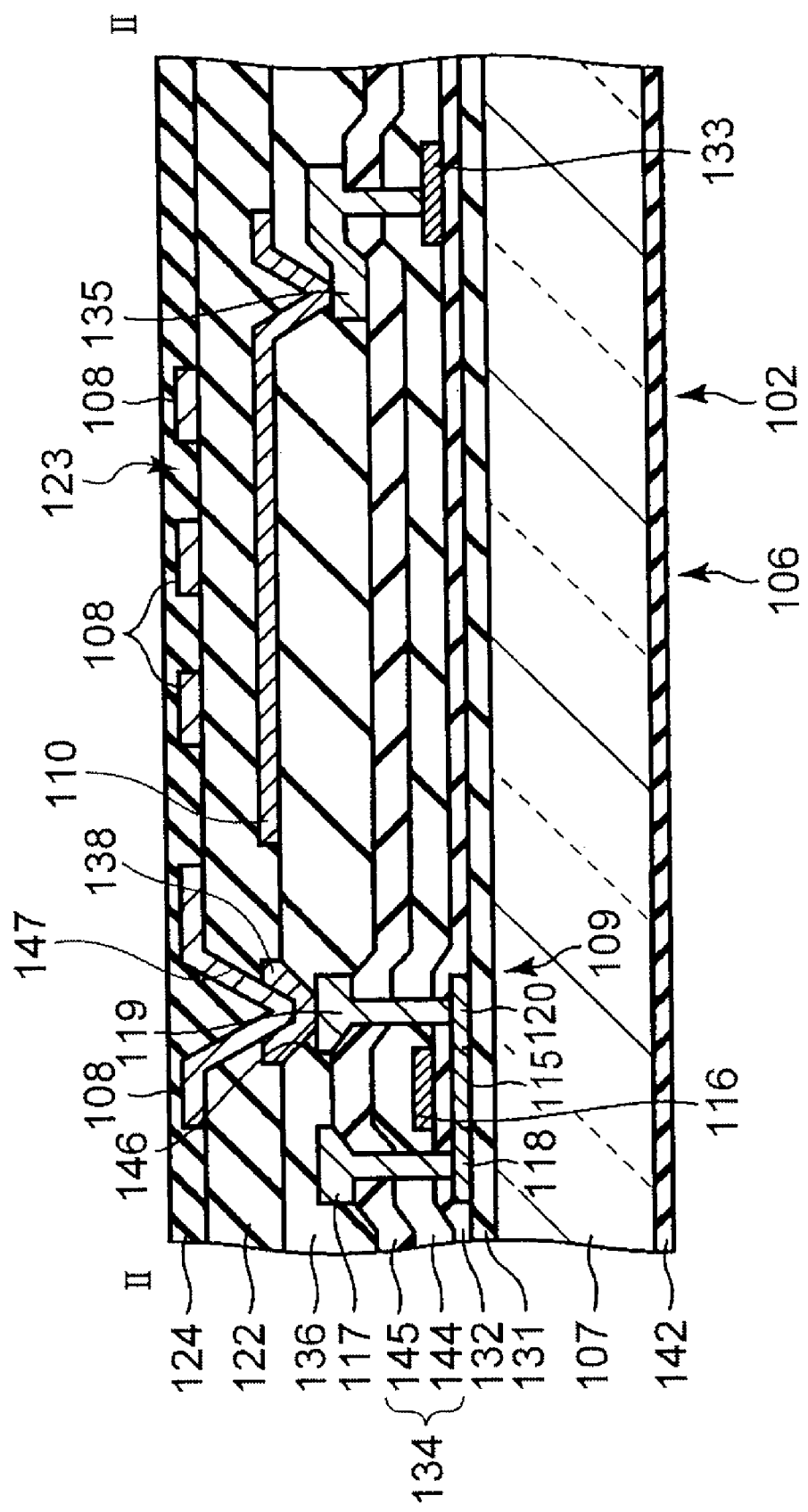
FIG. 4 is a schematic cross sectional view taken on section line □-□ of FIG. 2 of the array substrate of the liquid crystal display device in accordance with the first embodiment of the present invention.

As shown in FIG. 4, an undercoat insulating film 131 is disposed on the insulating substrate 107 and a semiconductor film 115 made of poly-silicon is formed on the undercoat insulating film 131. Further, a gate insulating film 132 is disposed on the undercoat insulating film 131 and the semiconductor film 115.

The scan line Y, the gate electrode 116 and a first electrode 133 are arranged on the gate insulating film 132. The gate electrode 116 is electrically connected to the scan line Y and arranged opposite to the semiconductor film 115 via a gate insulating film 132.

An interlayer insulating film 134 is constructed of a first interlayer insulating film 144 and a second interlayer insulating film 145, which functions as a passivation film. The first interlayer insulating film 144 and the second interlayer insulating film 145 are continuously formed on the gate insulating film 132. In the present embodiment, the first interlayer insulating film 144 is made of SiNx and the second interlayer insulating film 145 is made of SiOx.

The signal line X, the source electrode 117, the drain electrode 119 and a second electrode 135 are disposed on the interlayer insulating film 134, which are made of conductive material, for example, MAM which means a metal film laminated with Mo/Al—Nd/Mo (molybdenum/aluminum-neodymium/molybdenum).

The source electrode 117 connected to the signal line X is electrically connected to a source region 118 through a contact hole formed at the gate insulating film 132 and the interlayer insulating film 134. A drain electrode 119 is electrically connected to a drain region 120 of the semiconductor film 115 through a contact hole formed in the gate insulating film 132 and the interlayer insulating film 134. The second electrode 135 is also electrically connected to the first electrode 133 through a contact hole formed in the interlayer insulating film 134. The first electrode 133 and the second electrode 135 are formed as a common wiring 121.

The interlayer insulating film 134, the switching element 109, the signal line X and the second electrode 135 are covered with a first organic insulating film 136. The first organic insulating film 136 is made of photoresist. A first contact hole 146 is formed in the first organic insulating film 136 which overlies the drain electrode 119. The common electrode 110 and a connection element 138, which are made of a transparent conductive material, for example, ITO (indium tin oxide), are formed on the first organic insulating film 136.

The common electrode 110 arranged in a matrix is electrically connected to the second electrode 135 through a contact hole. The connection element 138 which is electrically connected to the drain electrode 119 is formed by using the same material as the common electrode 110.

In the present embodiment, the first contact hole 146 is entirely covered with the connection element 138. More specifically, the connection element 138 covers exposed area on the first contact hole 146 for the drain electrode 119. A second organic insulating film 122 is disposed on the first organic insulating film 136, the common electrode 110 and the connection element 138. The second contact hole 147 is formed in the second organic insulating film 122 in correspondence with the connection element 138.

The pixel electrode 108, which is made of a transparent conductive material, for example, ITO (indium tin oxide), is formed on the second organic insulating film 122. The pixel electrode 108 having slits is disposed opposite to the common electrode 110 and is electrically connected to the connection element 138 via a second contact hole 147. An alignment film 124 is disposed on the second organic insulating film 122 and the pixel electrodes 108.

According to this embodiment, the connection between the drain electrode of the switching transistor and the pixel electrode is completely made without disconnection between the drain electrode and the pixel electrode.

Figure 5:
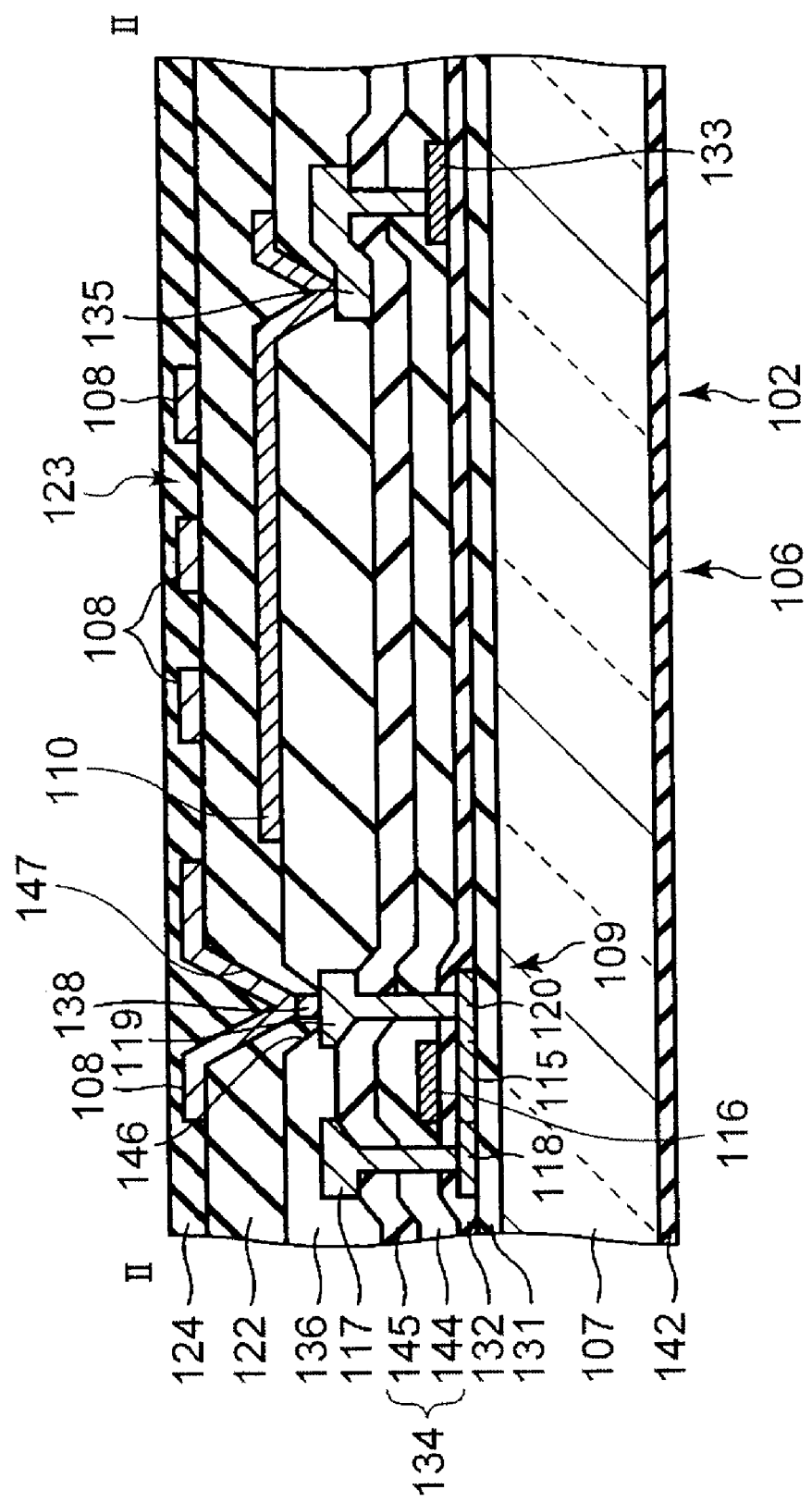
FIG. 5 is a schematic cross sectional view taken on section line □-□ of FIG. 2 of an array substrate of a liquid crystal display device in accordance with a second embodiment of the present invention.

FIG. 5 shows a second embodiment according to this invention. The connection element 138 is formed in the inside of the first contact hole 146 so as to partially cover the drain electrode 119. According to this embodiment, almost the same effect as the first embodiment can be obtained.

Figure 6:
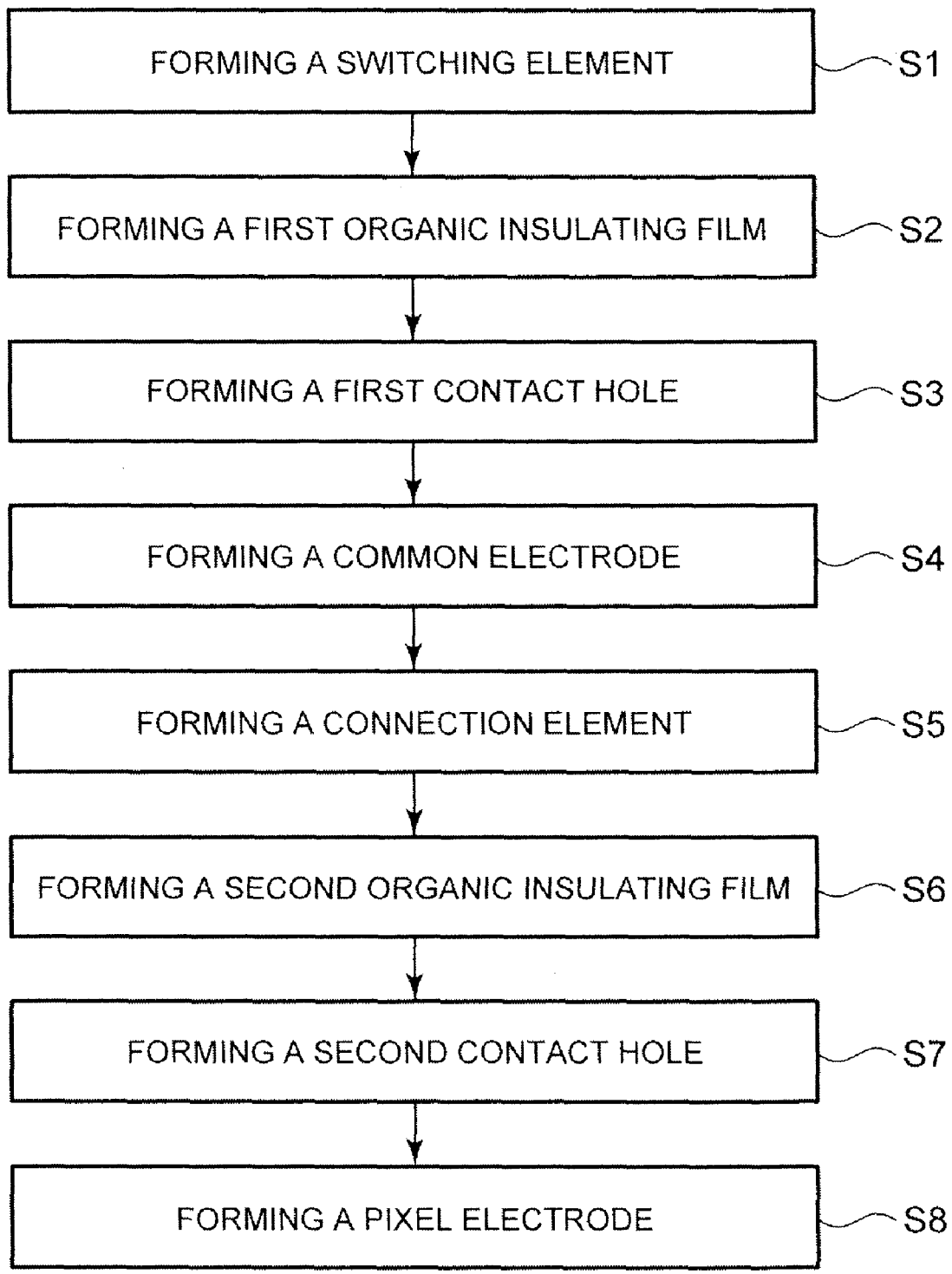
FIG. 6 is a schematic flow chart of steps of producing the liquid crystal display device of the present invention.

The production method of the above array substrate 102, particularly about the pixel 106, will be described with reference to FIG. 6.

First, an insulating substrate 107 is prepared. Then, an undercoat insulating film 131 and a semiconductor film made of amorphous silicon are disposed on the insulating substrate 107 by CVD (Chemical Vapor deposition), sequentially. The thickness of the semiconductor film is generally from 30 nm to 100 nm.

Next, the semiconductor film is instantaneously heated by excimer laser annealing (ELA) so as to be converted into a polycrystalline silicon and is patterned by PEP (Photo Engraving Process). In this way, a semiconductor film 115 is formed.

After this, a gate insulating film 132 made mostly from TEOS (Tetra Ethyl Ortho Silicate) is deposited on the undercoat insulating film 131 and the semiconductor films 115 by plasma CVD method. The thickness of the gate insulating film 132 is, for example, generally 100 nm. Then, a conductive film is deposited on the gate insulating film 132 made from MoW and is patterned by PEP. Thus, a gate electrode 116, a scan line Y and a first electrode 133 are obtained.

Next, a source region 118 and a drain region 120 are formed in the semiconductor film 115 by ion implantation doping using the gate electrode 116 as a mask. Then, a first interlayer insulating film 144 made from SiNx is deposited on the gate insulating film 132, the gate electrode 116, the scan line Y and the first electrode 133 by plasma CVD method. After that, a second interlayer insulating film 145 made of SiOx is deposited on the first interlayer insulating film 144. An interlayer insulating film 134 is composed of the first interlayer insulating film 144 and the second interlayer insulating film 145.

Next, the gate insulating film 132 and the interlayer insulating film 134 are etched by an etching process, thereby forming contact holes on the source regions 118, drain regions 120 and the first electrodes 133. Then, a signal line X, a source electrode 117, a drain electrode 119 and a second electrode 135 are formed of MAM (step S1). After this, a first organic insulating film 136 having a contact hole is formed by patterning a photoresist film on the interlayer insulating film 134, a switching element 109 and the signal line X and a second electrode 135 (step S2, step S3).

Next, ITO is disposed on a periphery of the contact hole of the first organic insulating film 136 by sputtering and is patterned by PEP. Therefore, a common electrode 110 and a connection element 138 are simultaneously formed by using the same material on the first organic insulating film 136 (step S4, step S5). The connection element 138 is electrically connected to the drain electrode 119 via a first contact hole 146. After that, a second organic insulating film 122 having a second contact holes 147 is formed by patterning a photoresist layer on the first organic insulating film 136, the common electrode 110 and the connection element 138 (step S6, step S7).

Next, ITO is disposed on the second organic insulating film 122 by sputtering and is patterned by PEP. Therefore, a pixel electrode 108 which is connected to the connection element 138 via a second contact hole 147 is formed on the second organic insulating film 122 (step S8). After this, an alignment film 124 is disposed on the second organic insulating film 122.

In the above liquid crystal display device, the pixel electrode 108 is electrically connected to the drain electrode 119 via the connection element 138. More specifically, the connection element 138 is formed in the first contact hole 146, and then the second contact hole 147 is formed in the second organic insulating film 122, sequentially. Finally, the pixel electrode 108 is electrically connected to the drain electrode 119 via the second contact hole 147.

The connection element 138 protects the first contact hole 146 and the second contact hole 147 from the residue of the second organic insulating film 122, thereby preventing disconnection between the pixel electrode 108 and the drain electrode 119. In addition, the common electrode 110 and the connection element 138 are simultaneously formed by using the same material, thereby not increasing the number of fabrication steps and production costs.

According to the present invention, the connection between the drain electrode of the switching transistor and the pixel electrode is reliably made without disconnection. Therefore, a liquid crystal display device having a high quality and a high manufacturing yield to can be provided.

The first organic insulating film 136 may be made of a color filter layer so as to obtain a COA (color filter on array) mode liquid crystal display panel. Moreover, the switching element 109 may be formed with double gate structure.

The present invention is not limited to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed herein.

What is claimed is:

1. A method of producing a liquid crystal display device, comprising the steps of:
   (a) forming a plurality of signal lines, scan lines and switching elements on an array substrate;
   (b) forming a first organic insulating film covering the signal lines, the scan lines and the switching elements;
   (c) forming common electrodes on the first organic insulating film;
   (d) forming first contact holes in the first organic insulating film in correspondence with the switching elements;
   (e) forming connection elements electrically connected to respective of the switching elements through the first contact holes without extending from the first contact holes;
   (f) forming a second organic insulating film covering the first organic insulating film and the connection elements;
   (g) forming second contact holes in the second organic insulating film in correspondence with the connection elements; and
   (h) forming pixel electrodes electrically connected to respective connection elements through the second contact holes, the pixel electrodes facing each common electrode and having a plurality of slits arranged in parallel.

2. The method of producing a liquid crystal display device of claim 1, wherein the steps (c) and (e) are performed simultaneously.

3. The method of producing a liquid crystal display device of claim 1, wherein each first contact hole is partially covered with the respective connection element.

4. The method of producing a liquid crystal display device of claim 1, wherein each switching element includes gate, drain and source electrodes, and the drain electrode is connected to the respective pixel electrode through the respective connection element.

5. A liquid crystal display device, comprising:
- a first substrate including a plurality of pixels arranged in a matrix;
- a second substrate arranged opposite to the first substrate;
- a liquid crystal layer held between the first and second substrates;
- scan lines extending in a row direction of the pixels on the first substrate;
- signal lines extending in a column direction of the pixels on the first substrate;
- switching elements arranged in each of the pixels on the first substrate;
- a first organic insulating film covering the signal lines, the scan lines and the switching elements;
- common electrodes formed on the first organic insulating film;
- connection elements electrically connected to respective of the switching elements through first contact holes formed in the first organic insulating film without extending from the first contact holes;
- a second organic insulating film covering the first organic insulating film and the connection elements; and
- pixel electrodes having slits and electrically connected to respective connection elements through second contact holes formed in the second organic insulating film, the pixel electrodes facing each common electrode and having a plurality of slits arranged in parallel; wherein
- the liquid crystal layer is switched by using a lateral electric field between the pixel electrode and the common electrode formed on the first substrate, and
- the slits include first and second sets of slits arranged symmetrically with respect to a row direction, and the first and second sets of slits are arranged so that a line extending to a longitudinal direction of the first set of slits crosses with that of the second set of slits.

6. The liquid crystal display device of claim 5, wherein the connection elements and the common electrodes are formed of the same material.

7. The liquid crystal display panel of claim 5, wherein each first contact hole is partially covered with the respective connection elements.

* * * * *